(12) United States Patent
Cano

(10) Patent No.: US 11,880,451 B2
(45) Date of Patent: Jan. 23, 2024

(54) SECURED CODE PACKAGE FOR BROWSER PLUGIN

(71) Applicant: BlackBerry Limited, Waterloo (CA)

(72) Inventor: Nick Ehli Cano, San Jose, CA (US)

(73) Assignee: BlackBerry Limited, Waterloo (CA)

( * ) Notice: Subject to any disclaimer, the term of this patent is extended or adjusted under 35 U.S.C. 154(b) by 157 days.

(21) Appl. No.: 17/163,172

(22) Filed: Jan. 29, 2021

(65) Prior Publication Data

US 2022/0245235 A1 Aug. 4, 2022

(51) Int. Cl.
| | | |
|---|---|---|
| *G06F 21/55* | (2013.01) | |
| *G06F 21/56* | (2013.01) | |
| *G06F 21/51* | (2013.01) | |
| *G06F 7/58* | (2006.01) | |

(52) U.S. Cl.
CPC .............. *G06F 21/51* (2013.01); *G06F 7/588* (2013.01); *G06F 21/554* (2013.01); *G06F 21/566* (2013.01); *G06F 2221/2119* (2013.01)

(58) Field of Classification Search
CPC ...... G06F 21/125; G06F 21/128; G06F 21/51; G06F 21/54; G06F 21/554; G06F 21/556; G06F 2221/2119; G06F 7/588; H04L 63/0428; H04W 12/106
See application file for complete search history.

(56) References Cited

U.S. PATENT DOCUMENTS

| | | | | |
|---|---|---|---|---|
| 8,200,962 B1 * | 6/2012 | Boodman | ............... | G06F 21/53 |
| | | | | 713/176 |
| 8,621,621 B1 * | 12/2013 | Burns | ................... | G06F 21/568 |
| | | | | 726/22 |
| 10,511,628 B1 * | 12/2019 | Richards | ............. | H04L 63/1483 |
| 11,349,814 B2 * | 5/2022 | Rene | ....................... | G06F 21/41 |
| 2013/0041986 A1 * | 2/2013 | Colton | ...................... | G06F 8/30 |
| | | | | 709/219 |
| 2014/0298403 A1 * | 10/2014 | Qureshi | ............. | H04L 43/0817 |
| | | | | 726/1 |

(Continued)

FOREIGN PATENT DOCUMENTS

| | | | | |
|---|---|---|---|---|
| EP | 3614292 A1 * | 2/2020 | | |
| WO | WO-2017069915 A1 * | 4/2017 | ......... | G06F 16/9014 |

OTHER PUBLICATIONS

Hu et al., Collaborative Privacy for Web Applications, pp. 1-14, Jan. 10, 2019.*

(Continued)

*Primary Examiner* — Jahangir Kabir
*Assistant Examiner* — Paul J Skwierawski
(74) *Attorney, Agent, or Firm* — Fish & Richardson P.C.

(57) ABSTRACT

Systems, methods, and software can be used for securing injected codes of a browser plugin. One example of a method includes establishing a code package to be injected into a web page. The code package comprises at least one element, and the at least one element includes a first script to be executed before executing a code of the web page. The method further includes injecting the at least one element to the web page to execute the first script. The execution of the first script comprises generating a script element comprising one or more secrets. The method further comprises appending the script element to the web page and deleting the script element from the web page.

18 Claims, 8 Drawing Sheets

(56) References Cited

U.S. PATENT DOCUMENTS

| | | | |
|---|---|---|---|
| 2016/0012145 A1* | 1/2016 | Benjamin | G06F 16/986 |
| | | | 715/234 |
| 2016/0344561 A1* | 11/2016 | Grajek | H04L 63/06 |
| 2018/0084003 A1* | 3/2018 | Uriel | H04L 63/168 |
| 2018/0219849 A1* | 8/2018 | Jones | H04L 67/53 |
| 2020/0153818 A1* | 5/2020 | Chauhan | G06F 21/128 |
| 2020/0153928 A1* | 5/2020 | Chauhan | H04L 67/1063 |
| 2020/0162359 A1* | 5/2020 | Borkar | H04L 43/50 |
| 2020/0244636 A1* | 7/2020 | Varanasi | H04L 63/08 |

OTHER PUBLICATIONS

Noman, H. A., & Abu-Sharkh, O. M. (2023). Code Injection Attacks in Wireless-Based Internet of Things (IOT): A Comprehensive Review and Practical Implementations. Sensors, 23(13), 6067. (Year: 2023).*

Extended European Search Report issued in European Appln. No. 21216619.3, dated May 27, 2022, 6 pages.

Hu et al., "Collaborative Privacy for Web Applications." 2019 57th Annual Allerton Conference on Communication, Control, and Computing (Allerton), Sep. 2019, 14 pages.

* cited by examiner

SECURED CODE PACKAGE FOR BROWSER PLUGIN

TECHNICAL FIELD

The present disclosure relates to a secured code package for a browser plugin.

BACKGROUND

By using application programming interface (API), developers can create powerful cross-browser plugins. Existing API provides secure access to many parts of the browser, but its abilities are limited. In order to access certain parts of the browser, a browser plugin may need to inject code directly into untrusted execution contexts which run web pages. However, the injected code communicates with the plugin that injected it and also runs in the untrusted execution context of the web pages. This may create a communication channel which opens up new attack surfaces that are reachable via the web.

DESCRIPTION OF DRAWINGS

Like reference numbers and designations in the various drawings indicate like elements.

DETAILED DESCRIPTION

A plugin for a web browser is extensively used for various functions and actions. The plugin installed in the web browser is often required to inject its code directly into untrusted execution code in a third-party environment and inversely, any user who has installed the plugin to the web browser might also have ability to access part of the injected code of the plugin. The present application provides a secured code package to ensure that a communication with the injected code in the third-party environment cannot be intercepted or tampered by an untrusted code on a target web page. Furthermore, any message communication utilizing the injected code in the untrusted execution code of the web pages may also be secured and identified efficiently. The secured code package of the plugin techniques will be described in greater detail below, with reference to FIGS. 1 to 6.

Figure 1:
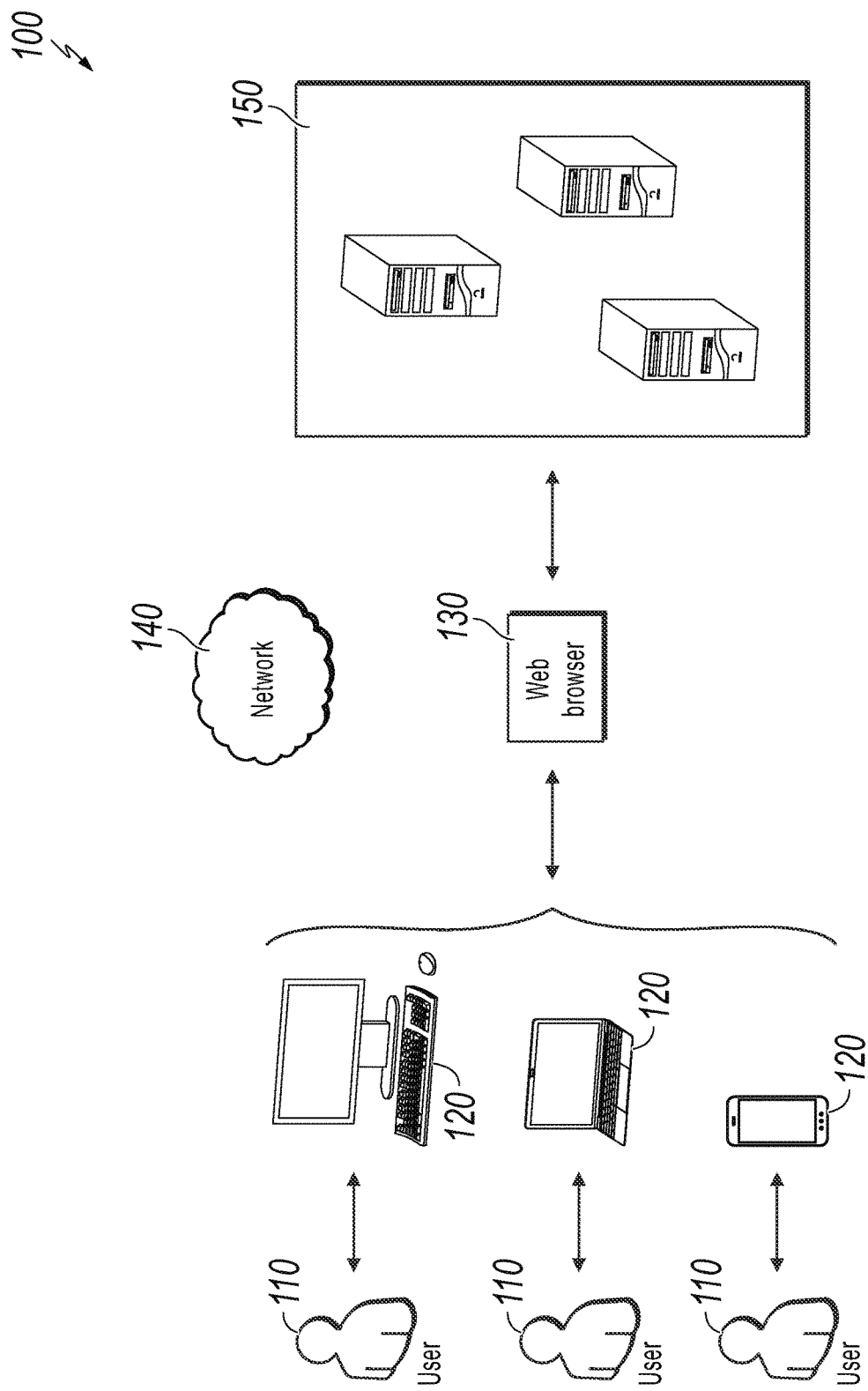
FIG. 1 is an example system for securing a code package of a browser plugin, according to an implementation.

FIG. 1 is an example system 100 for securing a code package of a browser plugin, according to an implementation. At a high level, the example system 100 includes one or more user devices 120, a network 140, and one or more servers 150. A user 110 may browse a website via a web browser 130 using the user device 120 and communicate with the server 150 through the network 140. In general, the system 100 can be implemented to establish the code package of the browser plugin for a secured communication between the user device 120 and the server 150.

In one example, the server 150 may establish a code package of a browser plugin which is to be installed in the web browser 130. The sever 150 establishes the code package of the browser plugin to be executed first, before any codes or scripts of a website. For example, the code package comprises one or more elements which include a content script set to be executed first. In addition, the content script in the element runs in secure contexts alongside the web page which ensures that the content script in the element always executes before the code of the web page. In response to an establishment of the content script, the content script uses a cryptographically secure random number generator to generate one or more secrets and codes to be included in a script element which is soon to be injected into the web browser 130. In some cases, the content script may be referred to an injector, a first script, and the like which refer to the first script to be executed.

In one example, a user (e.g., the user 110) may use a computing device (e.g., the user device 120) to download the browser plugin to be installed in the web browser 130. When the element of the code package is injected into the web browser 130, the content script is executed before any code of a web page. In some cases, when the content script is executed, simultaneously a script element, which later to be an injected code/script in the web page, is created in the document object model (DOM) of the web page in response to the execution of the content script. Furthermore, in response to the execution of the content script, the script element is deleted from the code package. In some cases, in response to the injection of the content script of the code package, the script element is deleted from the code package. Therefore, when the user 110 accesses a mobile application, e.g., opens Chrome to browse a web page, on the user device 120, the communication with the injected code in the web page and the browser plugin is secured.

Turning to a general description, a user device, e.g., the user devices 120, may include, without limitation, any of the following: computing device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Network 140 includes any suitable networks operable to support communication between components of system 100.

Network 140 may include any type of wired or wireless communication channel capable of coupling together computing nodes. Network 140 may include any interconnecting system capable of transmitting audio, video, electrical signals, optical signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 140 may be configured to support any communication protocols as would be appreciated by one of ordinary skill in the art upon viewing this disclosure.

Servers 150 include any suitable storage scheme including any software, hardware, firmware, and/or combination thereof capable of storing and processing information. Example servers 150 include individual data storage devices (e.g., memory, disks, solid-state drives), which may be part of individual storage engines and/or may be separate entities coupled to storage engines. Servers 150 may store third-party databases, database management systems, a file system, and/or other entities that include or that manage data repositories.

Figure 2:
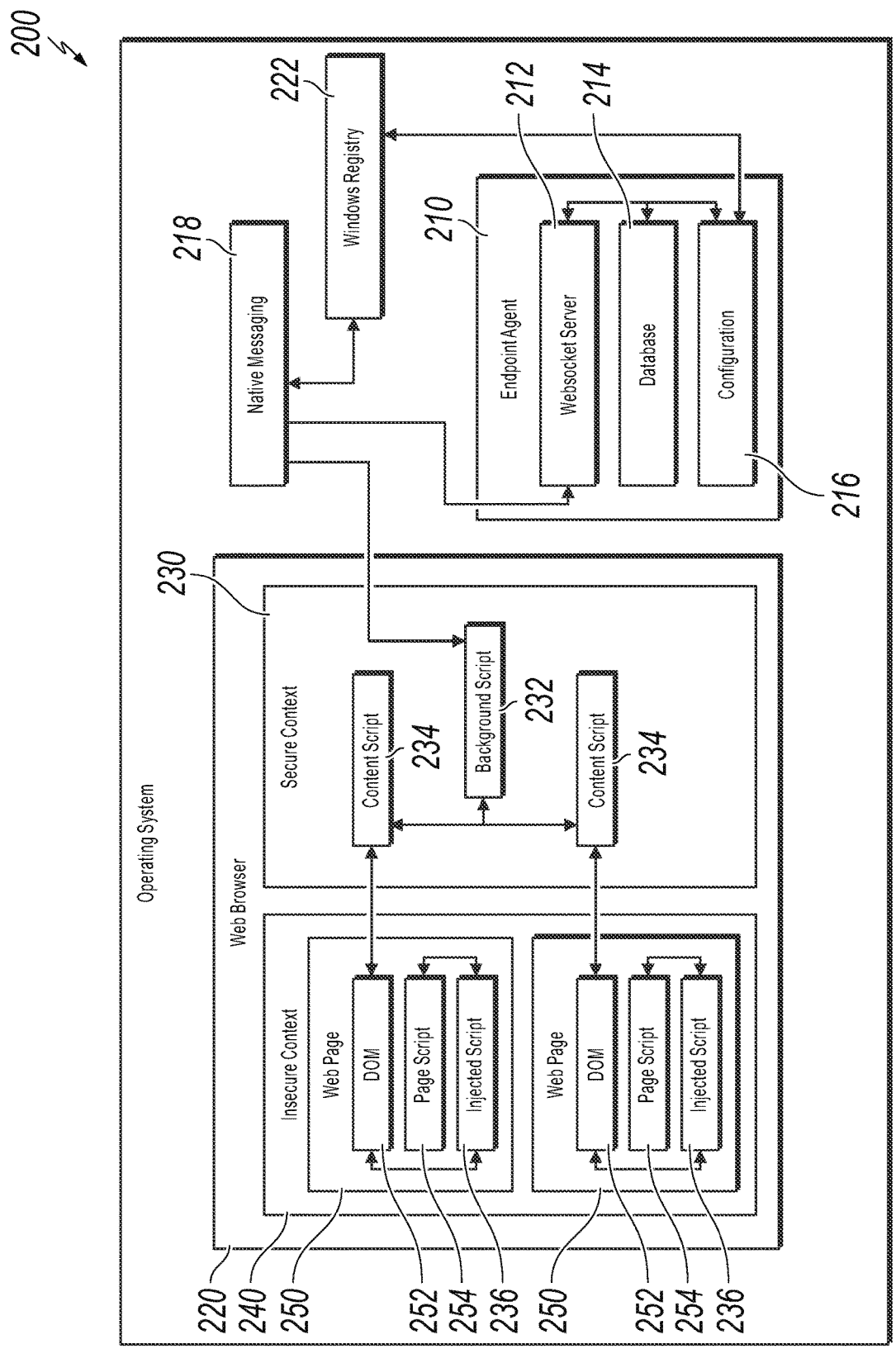
FIG. 2 is a diagram showing an example operating system for securing a code package of a browser plugin, according to an implementation.

FIG. 2 is an example operating system 200 for securing a code package of a browser plugin, according to an implementation. The operating system 200 comprises an environment of an endpoint agent 210, which may be the server 150 in FIG. 1, and a third-party environment which includes a web browser 220.

The endpoint agent 210 comprises a websocket server 212, a database 214, and a configuration unit 216 to communicate with the elements in the third-party environment. The endpoint agent 210 establishes a native messaging 218 which may be, or include, a described code package to be injected into the web browser 220. In some cases, the code package may comprise a background script 232 and a content script 234 operated under a secure context 230 of the web browser 220. In some cases, the background script 232 is a core part of a browser extension, e.g., a browser plugin, and is involved when the browser extension executes. The content script 234 is designed to be injected into an insecure context 240 of the web browser 220 and executed first in a DOM 252. For example, a web page 250 comprises the DOM 252, a page script 254, and an injected script 236. The injected script 236 is created in the DOM simultaneously when the content script 234 is injected into the web page 250. In some cases, as the injected script 236 comprises the secrets in the DOM, so that when the content script 234 is executed, e.g., is injected into the web page 250, the secrets are also deleted from the DOM correspondingly. Due to the content script 234 being embedded with an instruction to be executed before any code/script of the web page 250, the injected script 236 is securely created under the insecure context 240 of the web browser 220. In one case, the content script 234 includes 'run_at' set to 'document_start' to ensure that it runs before a code of a web page.

In some cases, the operating system 200 further comprises a windows registry 222 which can be used to share configuration between the native messaging 218 and the endpoint agent 210.

Figure 3:
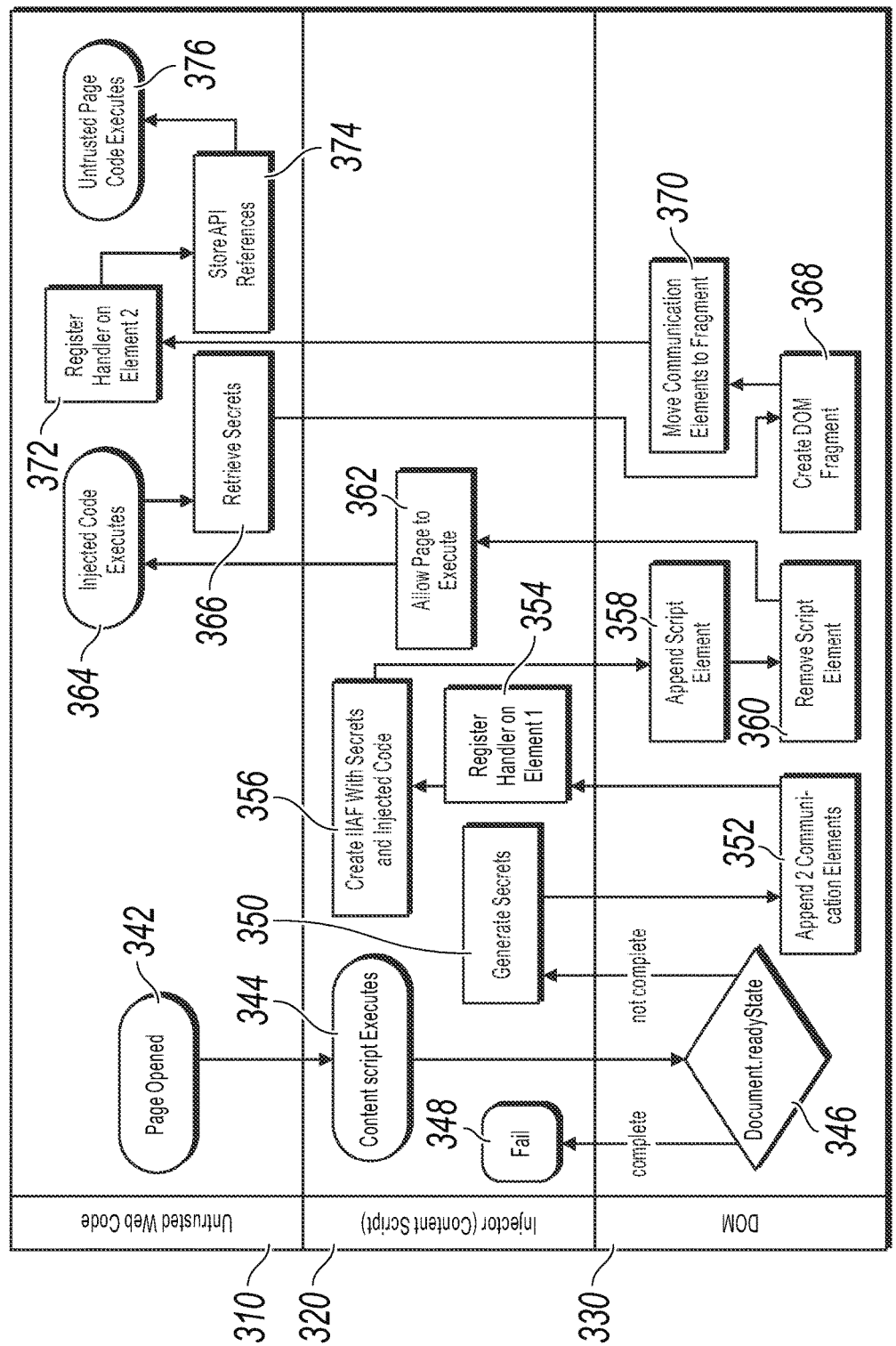
FIG. 3 is a diagram showing an example flow for securing a code package of a browser plugin, according to an implementation.

FIG. 3 is an example flow 300 for securing a code package of a browser plugin, according to an implementation. The flow 300 for securing the code package of the browser plugin illustrates a flow for securing the code package of the browser plugin performed between an untrusted code 310, an injector 320, and a DOM 330. The untrusted code 330 refers to a code of a web page that is unprotected but involved when a code of a described code package executes. The injector 320 may refer to a code package comprising an element which include a content script to be executed first in the DOM 330 structure. In one case, the injector 320 is the content script disclosed in FIGS. 1 and 2.

As shown in the example of FIG. 3, at 342, an untrusted web code 310 opens a page. At 344, an injector 320 executes a content script in response to opening the page. In some cases, the content script includes 'run_at' set to 'document_start' to ensure that the content script executes before a code of a web page. At 346, in response to the execution of content script, at 346, the DOM 330 structure indicates whether 'document.readyState' is completed based on a status of the page. When the 'document.readyState' is completed, at 348, the injection of the content script fails. On the other hand, when 'document.readyState' is not completed, e.g., no codes run before the content script/the injector 320, at 350, the injector generates secrets at 350.

In one case, the injector uses a cryptographically secure random number generator to generate some secrets. For example, 'dv' as in 128-byte password used for key derivation; 'salt' as in 64-byte salt used for key derivation; 'channelKey' as in 64-byte string used to identify communication events; 'hookChannelName' as in 64-byte string used to identify the trusted-to-untrusted channel; 'contentChannelName' as in 64-byte string used to identify the untrusted-to-trusted channel.

At 352, after using a password-based key derivation function (e.g., PBKDF2) to derive an advanced encryption standard (AES) key from the secrets, the injector 320 inserts a '<div>' with an 'id' of 'hookChannelName' into the DOM 330, followed by a '<div>' element with and 'id' of 'contentChannelName' to append communication elements. In some cases, the communication elements are used to send or to receive messages. The former communication element is used to send messages, and the latter communication element is used to receive the messages. In some cases, the send and receive communication elements are opposite from the perspective of the injected code. For example, the send communication element for the injected code (sender) is the receive communication element for the injector events (receiver). At 354, the injector 320 attaches an event handler to the receive communication element. The event handler is used to identify events with 'channelKey' as their name.

Next, at 356, the injector 320 wraps the secrets and the to-be-injected code in an Immediately Invoked Anonymous Function (IIAF). The IIAF is then placed inside a '<script>' element, which is injected into the DOM 330 before any other '<script>' elements, ensuring it is the first script to execute in the untrusted context. At 358, this '<script>' element is created into the DOM, and the '<script>' element in the DOM is ready to be executed. For example, the '<script>' element is appended in the DOM and is in queue. At 360, after the '<script>' element is created/appended and ready to be executed in the DOM, the injector 320 deletes the '<script>' element from the DOM once the execution of the '<script>' element is launched. For example, the injector 320 deletes created script element in the DOM, e.g., the output of step 356, in response to the execution of the '<script>' element, such that the IIAF and deletion of the script element can ensure that none of the secrets are leaked.

At 362, the injector 320 allows the web page to execute after the script element has been deleted and the script element is in queue in the DOM.

At 364, once the injector has allowed the page to execute, the browser will begin executing scripts on the page because the script element is already in queue even after the deletion of the script element, starting with the injected code, e.g., created by the injector 320. For example, the browser queues up the script element for execution, the injected code in the DOM executes after the script element, e.g., a DOM node, is deleted. At 366, as soon as the injected code runs, it uses PBKDF2 to derive the AES key from the secrets. In one case, once the AES key is derived from the secrets, the secrets are deleted from the DOM along with the '<script>' element. Subsequently, at 368, in response to the derived secrets, the injected code creates a DOM fragment as a new DOM instance using 'document.createDocumentFragment( )'. Afterwards, at 370, the DOM 330 moves the communication elements into this fragment, ensuring the communication elements can no longer be queried, selected, observed, or accessed by untrusted code of the web page. At 372, to receive messages, the injected code attaches an event handler for events named 'channelKey' to the receive communication element. At 374, the web page then stores API references for a message communication, e.g., in the injected code. Afterwards, at 376, untrusted page code can be executed and does not have access to the secrets or the communication elements.

In some cases, the injected code saves references to all functions and classes it may need, ensuring that any untrusted code cannot hook, replace, or otherwise tamper with the execution of the injected code.

Figure 4:
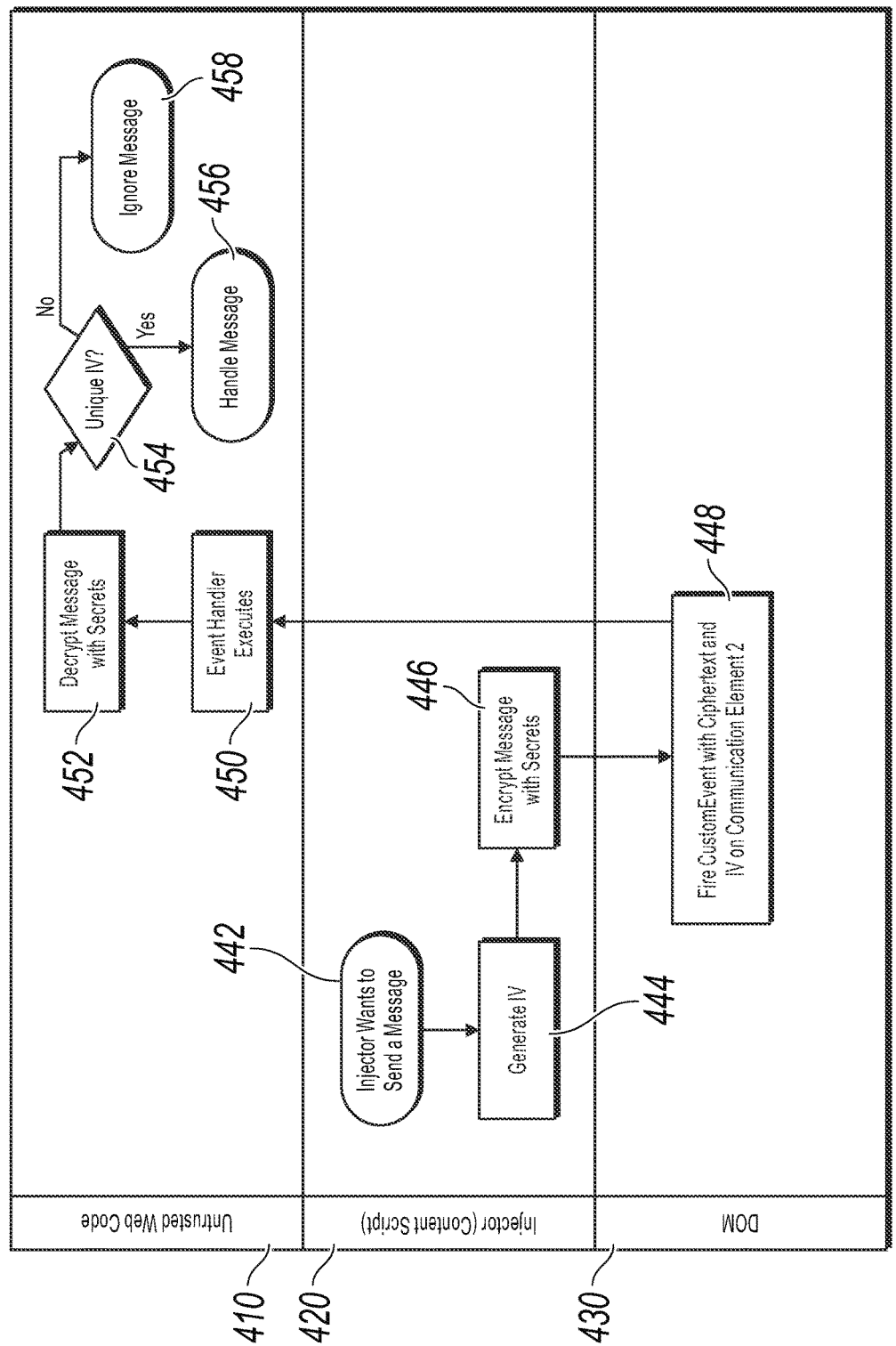
FIG. 4 is a diagram showing an example flow for sending a message from an injector, according to an implementation.

FIG. 4 is an example flow 400 for sending a message from an injector, according to an implementation. Following the setup process disclosed in FIG. 3, a message communication via a channel generated in FIG. 3 can begin.

In one case, at 442, an injector 420 determines to send a message. In response, at 444, the injector 420 generates an initialization vector (IV). In some cases, the IV is a fresh, random, securely-generated 16-byte IV. At 446, the injector 420 encrypts the message with secrets. In some cases, the message is encrypted using AES-CBC (cypher blocker chaining). Once the message is encrypted and attached with an IV, a 'CustomEvent' is created with 'name' set to 'channelKey' and 'detail' set to a JavaScript object notation (JSON) string containing a cipher text and corresponding the IV. At 448, the 'CustomEvent' is then dispatched on the send communication element using 'elementSend.dispatchEvent( )'. At 450, the send communication element comprising this event would be caught or recognized by the handler on the other side of the channel, e.g., an untrusted web code 410 of the web browser. At 452, the untrusted web code 410 then decrypts and processes the message with the secrets. At 454, the untrusted web code 410 would determine whether the message includes the unique IV.

When the IV is identified in the message as unique, at 456, the message would be handled by the untrusted web code 410. On the other hand, when the IV is not identified in the message as unique, at 458, the message would be ignored by the untrusted web code 410.

Figure 5:
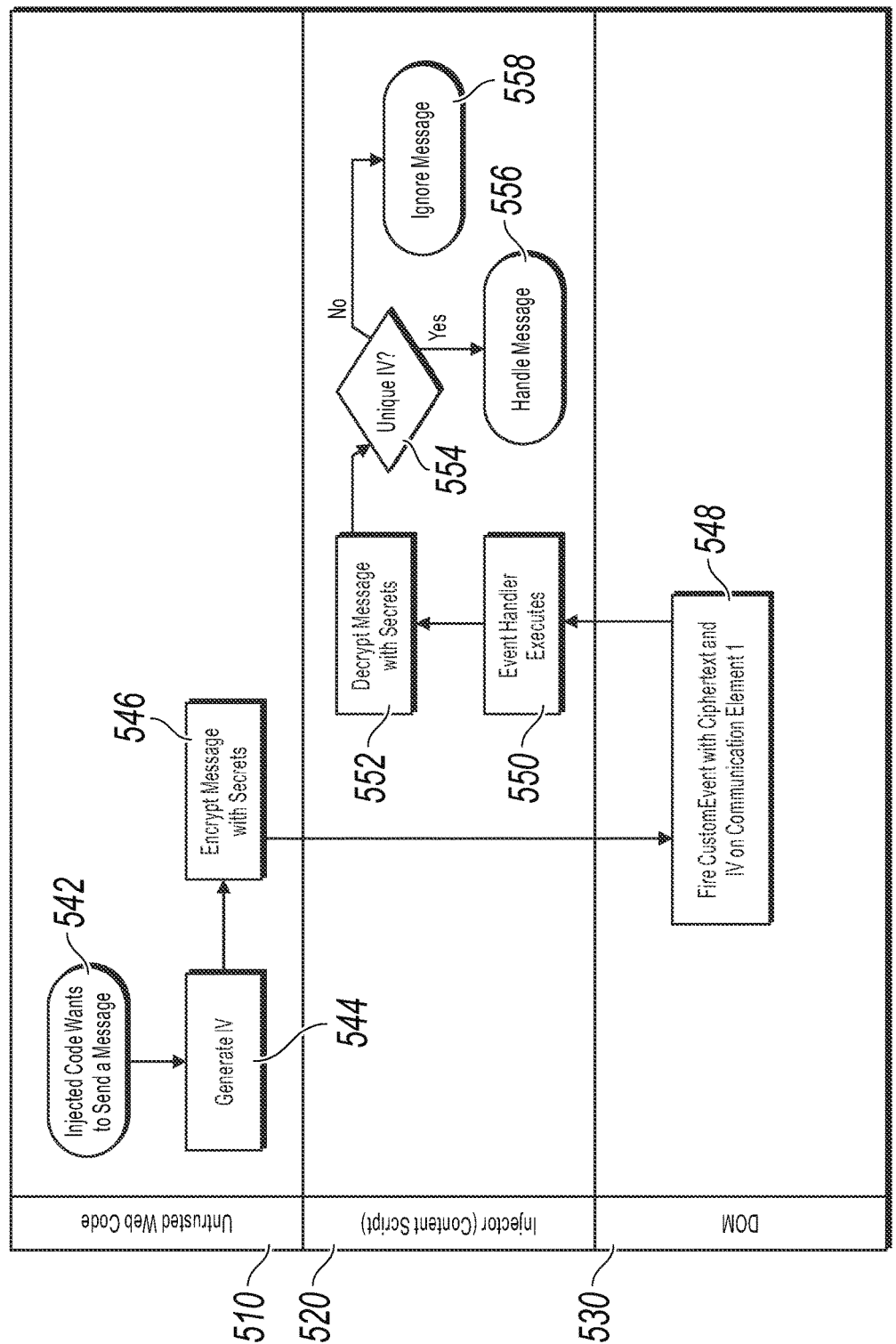
FIG. 5 is a diagram showing an example flow for receiving a message by an injector, according to an implementation.

FIG. 5 is an example flow 500 for receiving a message by an injector, according to an implementation. Following the setup process disclosed in FIG. 3, a message communication via a channel generated in FIG. 3 can begin.

In one case, at 542, the injected code in an untrusted web code 510 of a web page determines to send a message. At 544, the injected code in an untrusted web code 510 generate an IV in response to sending the message. Furthermore, at 546, the injector 520 encrypts the message with secrets. In some cases, the message can be encrypted by the same method disclosed in FIG. 4.

Furthermore, at 548, the injected code in a DOM 530 of the web page fires a 'CustomEvent' with ciphertext and IV on a send communication element. In some cases, the receive communication element can be dispatched using the same method disclosed in FIG. 4. At 550, the receive communication element comprising this event would be caught or recognized by a handler at the injector 520. At 552, the injector 520 then decrypts and processes the message with the secrets. Furthermore, at 554, the injector 520 determines whether the message includes the IV, e.g., a unique IV generated for sending a message.

When the IV is identified in the message as unique, at 556, the message is handled by the injector 520. On the other hand, when the IV is not identified in the message as unique, at 458, the message is ignored by the injector 520.

As an added security measure, previously used IVs are tracked and messages which re-use IVs are dropped, hardening the channel against replay attacks. Furthermore, the message including commands and information which is sent or received via the channel disclosed in FIGS. 4 and 5 may not include any sensitive data nor exert any control over the plugin itself. Therefore, the security of the message communication can be ensured.

Figure 6:
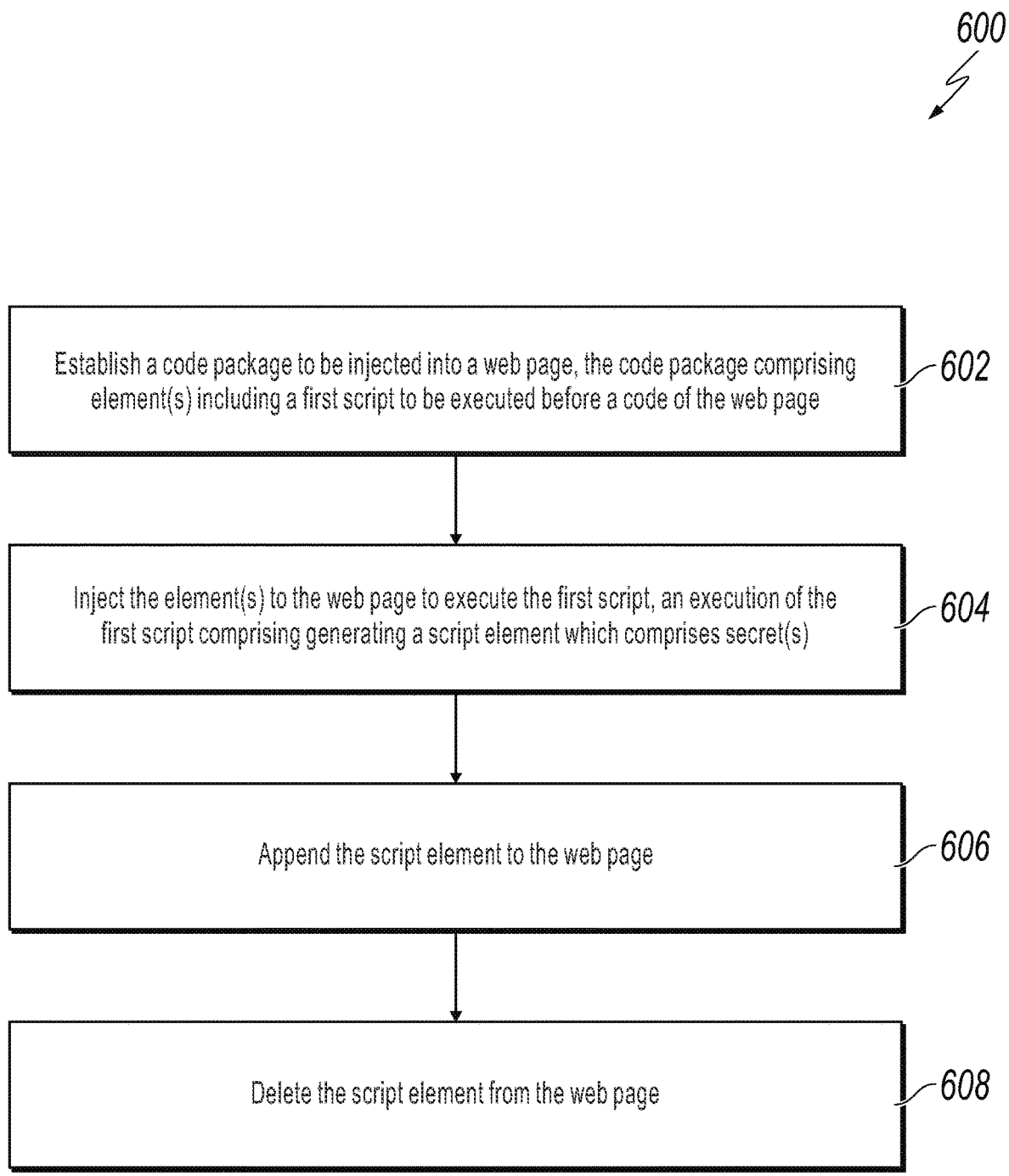
FIG. 6 is a flowchart showing an example method for securing a code package of a browser plugin, according to an implementation.

FIG. 6 is a flowchart showing an example method 600 for securing a code package of a browser plugin, according to an implementation. The method 600 can be implemented by a system for securing a code package of a browser plugin, e.g., the systems 100 or 200, shown in FIGS. 1 and 2. The example method 600 shown in FIG. 6 can be implemented using additional, fewer, or different operations, which can be performed in the order shown or in a different order.

The technique for securing the code package of the browser plugin as described herein can be accomplished by ensuring the code package of the browser plugin is executed before any codes of a web page. In order to ensure that the code package is the first script to be executed, the code package comprises an element which includes a content script demanding an execution before starting a document, e.g., a code of the web page. Furthermore, as the execution of the element includes a creation or appendix of the element in DOM structure, the appended element is then deleted from the web page to secure that none of the secrets in the elements are leaked.

The method 600 starts at step 602 with establishing a code package to be injected into a web page. The code package comprises an element, and the element includes a first script to be executed before a code of the web page. In some cases, the first script comprises 'run_at' set to 'document_start' to demand that the first script will be executed first when being injected to the web page. In some cases, the code package may comprise one or more scripts, for example, a first script to be executed first, before executing any codes of the web page, and a second script which executes after the first script is executed. In some cases, an extension of a web browser may perform the establishment of the code package.

At step 604, the method 600 injects the element into the webpage to execute the first script. In some cases, an execution of the first script comprises generating a script element which comprises the one or more secrets. In some cases, the secrets are generated by a random number generator, for example, a cryptographically secure random number generator. In some cases, the script element comprises an immediately-invoked function expression (IIFE), for example, an immediately-invoked anonymous function (IIAF). In some cases, injecting the element into the web page to execute the first script may comprise writing the element into a DOM structure associated with the web page. For example, the element may create the secrets in the DOM structure when executing the element, e.g., the injected script with reference to FIG. 3.

At step 606, the method 600 appends the script element to the web page. Once the script element is appended to the web page, the script element is in queue and ready to be executed.

At step 606, the method 600 deletes the script element from the web page. In some cases, the script element is deleted from the web page in response to the injection of the element into the web page. In some cases, the element is deleted from the web page in response to the execution of the first script injected into the web page. In some cases, the method 600 may only delete the secrets from the web page.

In some cases, the method 600 may further comprise receiving one or more communication elements, in response to the secrets, and attaching a handler to the one or more communication elements. In some cases, the method 600 may further generate a channel for a message communication with the web page by using the communication elements attached with the handler. The communication elements may be used to send a message or to receive a message, and the handler may be used to recognize an event of the message.

In some cases, the message communication comprises generating an initialization vector, encrypting a message by using the initialization vector and the secrets, and sending the message using the channel. In some cases, the message communication comprises receiving a message from the web page using the channel, identifying the handler in the one or more communication elements, decrypting the message by identifying an initialization vector and the one or more secrets, and processing the message when the initialization vector is identified. The initialization vector is generated by an injected code which is created when executing the first script, e.g., the injected script in FIG. 3.

In some cases, the communication elements is transferred into a created document fragment, independently of the DOM structure associated with the web page, during the execution of the first script injected into the web page.

The steps 602 to 606 may be performed by a same operator. For example, the steps 602 to 606 may be performed by a same server (e.g., server 150). In some cases, the steps 602 to 606 may be performed separately, by different operators. For example, the steps of establishing the code package, injecting the first script of the element into the web page, and deleting the element from the web page may be performed by a first server, while the steps of generating the channel for the message communication and any actions related to the channel may be performed by a second server that is different from the first server. More specifically, the steps 602-606 may be performed in different environments. For example, the execution of the first script may be accomplished in a third-party environment, e.g., a web browser.

With reference to the description of FIGS. 1-6, the secured code package for a browser plugin, as described herein, can provide the following technical effects. The described code package techniques can require a script to include an instruction indicating to be executed before any scripts of a web page and to delete the script upon the script being created in DOM, so that the security of the created script in the DOM can be ensured. Furthermore, an attack from malware, a tamper with or a replacement of the injected codes can be avoided because the secured code package has been established as the injected script in the DOM structure before any party could have an access to it. In addition, including the IIAF and deleting the element from the DOM structure prevents any leak of secrets or content scripts.

The described code package techniques can also improve security and efficiency of a message communication through a web browser or a web page which has the injected script implemented by the described code package. As the element (s) in the described code package is established, this process would then trigger an establishment series of communication elements, handlers, keys, and initialization vectors for enhancing the efficiency and security of the message communication. For example, the handler can be used to recognize an event of the massage, and the initialization vector can be used to enhance the security of the message. Therefore, the computing performance can be improved.

Figure 7:
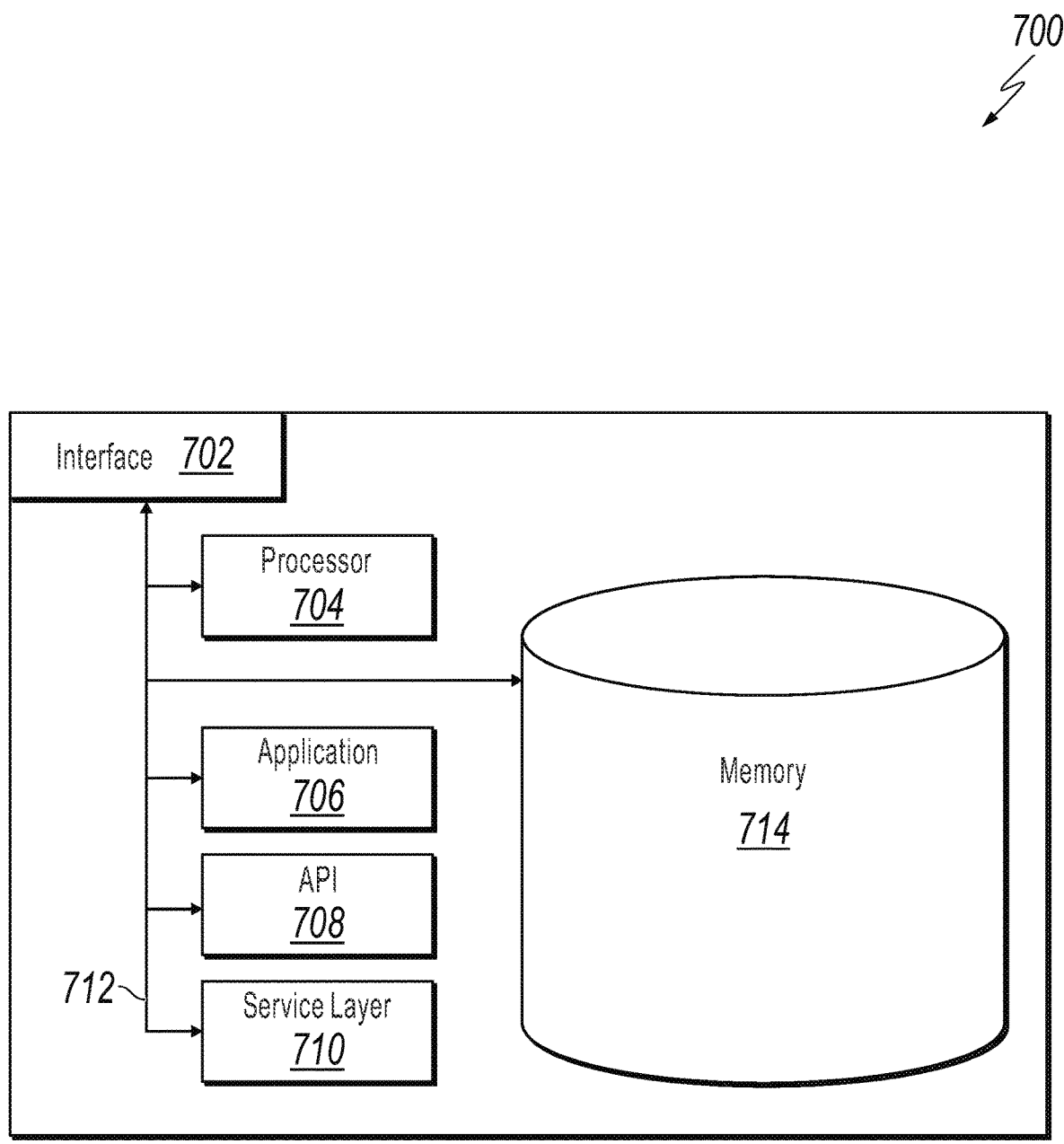
FIG. 7 illustrates a high level architecture block diagram of a server, according to an implementation.

FIG. 7 illustrates a high level architecture block diagram of a server 700 according to an implementation. The server 700 can be implemented as one of the web servers 150 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The server 700 includes a computing system configured to establish a secured code package for a browser plugin and generate a message communication when executing the plugin in the browser. In some cases, the server 700 may include a computing system implementing processes and methods disclosed in FIGS. 2 to 6. In some cases, the processing algorithm of the code package establishment can be implemented in an executable computing code, e.g., C/C++ executable codes. In some cases, the server 700 can include a standalone Linux system that runs batch applications. In some cases, the server 700 can include mobile or personal computers.

The server 700 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The server 700 can serve as a client, network component, a server, a database or other persistency, and/or any other components. In some implementations, one or more components of the server 700 may be configured to operate within a cloud-computing-based environment.

At a high level, the server 700 is an electronic computing device operable to receive, transmit, process, store, or manage data. According to some implementations, the server 700 can also include or be communicably coupled with an application server, e-mail server, web server, caching server, streaming data server, business intelligence (BI) server, and/or other server.

The server 700 can collect data of network events or mobile application usage events over network 140 from a web browser 130 or a client application, e.g., an installed plugin. In addition, data can be collected by the server 700 from internal users (e.g., from a command console or by another appropriate access method), external or third parties, other automated applications, as well as any other appropriate entities, individuals, systems, or computers.

Each of the components of the server 700 can communicate using a system bus 712. In some implementations, any and/or all the components of the server 700, both hardware and/or software, may interface with each other and/or the interface 702 over the system bus 712 using an application programming interface (API) 708 and/or a service layer 710. The API 708 may include specifications for routines, data structures, and object classes. The API 708 may be either computer language-independent or -dependent and refer to a complete interface, a single function, or even a set of APIs. The service layer 710 provides software services to the server 700. The functionality of the server 700 may be accessible for all service consumers using this service layer. Software services, such as those provided by the service layer 710, provide reusable, defined business functionalities through a defined interface. For example, the interface may be software written in JAVA, C++, or other suitable languages providing data in Extensible Markup Language (XML) format or other suitable format. While illustrated as an integrated component of the servers 700, alternative implementations may illustrate the API 708 and/or the service layer 710 as stand-alone components in relation to other components of the server 700. Moreover, any or all parts of the API 708 and/or the service layer 710 may be implemented as child or sub-modules of another software module, enterprise application, or hardware module without departing from the scope of this disclosure.

The server 700 includes an interface 702. Although illustrated as a single interface 702 in FIG. 7, two or more interfaces 702 may be used according to particular needs, desires, or particular implementations of the server 700. The interface 702 is used by the server 700 for communicating with other systems in a distributed environment connected to a network (whether illustrated or not). Generally, the interface 702 comprises logic encoded in software and/or hardware in a suitable combination and operable to communicate with the network. More specifically, the interface 702 may comprise software supporting one or more communication protocols associated with communications such that the network or interface's hardware is operable to communicate physical signals within and outside of the server 700.

The server 700 includes at least one processor 704. Although illustrated as a single processor 704 in FIG. 7, two or more processors may be used according to particular needs, desires, or particular implementations of the server. Generally, the processor 704 executes instructions and manipulates data to perform the operations of the server 700. Specifically, the processor 704 executes the functionality required for establishing a described code package disclosed in FIGS. 1 to 6.

The server 700 also includes a memory 714 that holds data for the server 700. Although illustrated as a single memory 714 in FIG. 7, two or more memories may be used according to particular needs, desires, or particular implementations of the server 700. While memory 714 is illustrated as an integral component of the server 700, in alternative implementations, memory 714 can be external to the server 700.

The application 706 is an algorithmic software engine providing functionality according to particular needs, desires, or particular implementations of the server 700, particularly with respect to functionality required for anomaly detection. Although illustrated as a single application 706, the application 706 may be implemented as multiple applications 706 on the server 700. In addition, although illustrated as integral to the server 700, in alternative implementations, the application 706 can be external to the server 700.

There may be any number of the server 700 associated with, or external to, and communicating over a network. Further, this disclosure contemplates that many users may use one server 700, or that one user may use multiple servers 700.

Figure 8:
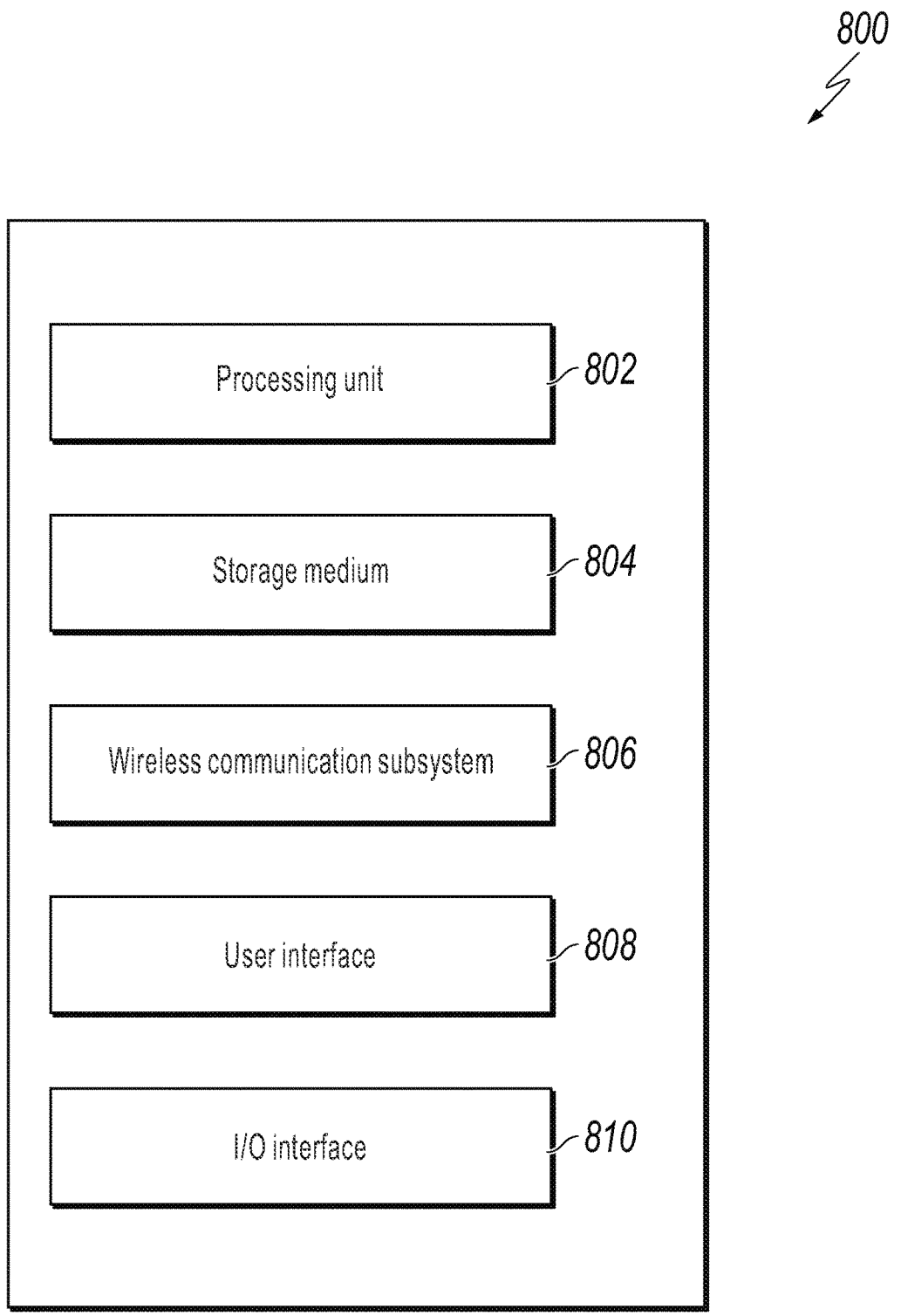
FIG. 8 is a block diagram illustrating an example user device, according to an implementation.

FIG. 8 is a block diagram illustrating an example user device 800 according to an implementation. The example user device 800 can be implemented as the user device 120 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 800 includes a processing unit 802, a computer-readable storage medium 804 (for example, read-only memory (ROM) or flash memory), a wireless communication subsystem 806, a user interface 808, and an I/O interface 810.

The processing unit 802 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 802 may be configured to generate control information, such as a measurement report, or to respond to received information, such as control information from a network node. The processing unit 802 may also be configured to make a Radio Resource Management (RRM) decision such as cell selection/reselection information, or trigger a measurement report. The processing unit 802 can also include other auxiliary components, such as random access memory (RAM) and ROM.

The computer-readable storage medium 804 can store an operating system (OS) of the device 700 and various other computer-executable instructions, logic or software programs for performing one or more of the processes, steps, or actions described above. In some cases, the computer-readable storage medium 804 can be transitory, non-transitory, or a combination thereof.

The wireless communication subsystem 806 may be configured to provide wireless communication for voice, data, and/or control information provided by the processing unit 802. The wireless communication subsystem 806 can include, for example, one or more antennas, a receiver, a transmitter, a local oscillator, a mixer, and a DSP unit. In some implementations, the wireless communication subsystem 806 can support MIMO transmissions. In some implementations, the receiver in the wireless communication subsystems 806 can be an advanced receiver or a baseline receiver. Two receivers can be implemented with identical, similar, or different receiver processing algorithms.

The user interface 808 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 810 can include, for example, a universal serial bus (USB) interface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   establishing a code package to be injected into a web page, wherein the code package comprises at least one element, wherein the at least one element includes a first script to be executed before executing a code of the web page;
   injecting the at least one element to the web page to execute the first script, wherein an execution of the first script comprises generating a script element which comprises one or more secrets that are generated by the execution of the first script, wherein the one or more secrets comprise at least a password and a salt value, wherein the script element comprises an immediately-invoked anonymous function;
   appending the script element to the web page; and
   after the appending, in response to an execution of the script element being launched, deleting the script element from the web page, so as to prevent leak of content of the script element.

2. The computer-implemented method of claim 1, wherein the one or more secrets are generated by a random number generator.

3. The computer-implemented method of claim 1, further comprising:

receiving one or more communication elements in response to the one or more secrets; and attaching a handler to the one or more communication elements.

4. The computer-implemented method of claim 3, further comprising:

generating a channel for a message communication with the web page by using the one or more communication elements attached with the handler.

5. The computer-implemented method of claim 4, wherein the message communication comprises:

generating an initialization vector;

encrypting a message by using the initialization vector and the one or more secrets; and sending the message using the channel.

6. The computer-implemented method of claim 4, wherein the message communication comprises:

receiving a message from the web page using the channel;

identifying the handler in the one or more communication elements;

decrypting the message by identifying an initialization vector and the one or more secrets, wherein the initialization vector is generated by an injected code which is created when executing the first script; and processing the message when the initialization vector is identified.

7. A non-transitory computer-readable medium containing instructions which, when executed, cause a computing device to perform operations comprising:

establishing a code package to be injected into a web page, wherein the code package comprises at least one element, wherein the at least one element includes a first script to be executed before executing a code of the web page;

injecting the at least one element to the web page to execute the first script, wherein an execution of the first script comprises generating a script element which comprises one or more secrets that are generated by the execution of the first script, wherein the one or more secrets comprise at least a password and a salt value, wherein the script element comprises an immediately-invoked anonymous function;

appending the script element to the web page; and after the appending, in response to an execution of the script element being launched, deleting the script element from the web page, so as to prevent leak of content of the script element.

8. The non-transitory computer-readable medium of claim 7, wherein the one or more secrets are generated by a random number generator.

9. The non-transitory computer-readable medium of claim 7, wherein the operations further comprise:

receiving one or more communication elements in response to the one or more secrets; and attaching a handler to the one or more communication elements.

10. The non-transitory computer-readable medium of claim 9, wherein the operations further comprise:

generating a channel for a message communication with the web page by using the one or more communication elements attached with the handler.

11. The non-transitory computer-readable medium of claim 10, the message communication comprises:

generating an initialization vector;

encrypting a message by using the initialization vector and the one or more secrets; and sending the message using the channel.

12. The non-transitory computer-readable medium of claim 10, the message communication comprises:

receiving a message from the web page using the channel;

identifying the handler in the one or more communication elements;

decrypting the message by identifying an initialization vector and the one or more secrets, wherein the initialization vector is generated by an injected code which is created when executing the first script; and processing the message when the initialization vector is identified.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

establishing a code package to be injected into a web page, wherein the code package comprises at least one element, wherein the at least one element includes a first script to be executed before executing a code of the web page;

injecting the at least one element to the web page to execute the first script, wherein an execution of the first script comprises generating a script element which comprises one or more secrets that are generated by the execution of the first script, wherein the one or more secrets comprise at least a password and a salt value, wherein the script element comprises an immediately-invoked anonymous function;

appending the script element to the web page; and after the appending, in response to an execution of the script element being launched, deleting the script element from the web page, so as to prevent leak of content of the script element.

14. The computer-implemented system of claim 13, wherein the one or more secrets are generated by a random number generator.

15. The computer-implemented system of claim 13, wherein the operations further comprise:

receiving one or more communication elements in response to the one or more secrets; and attaching a handler to the one or more communication elements.

16. The computer-implemented system of claim 15, wherein the operations further comprise:

generating a channel for a message communication with the web page by using the one or more communication elements attached with the handler.

17. The computer-implemented system of claim 16, wherein the message communication comprises:

generating an initialization vector;

encrypting a message by using the initialization vector and the one or more secrets; and sending the message using the channel.

18. The computer-implemented system of claim 16, wherein the message communication comprises:

receiving a message from the web page using the channel;

identifying the handler in the one or more communication elements;

decrypting the message by identifying an initialization vector and the one or more secrets, wherein the initialization vector is generated by an injected code which is created when executing the first script; and processing the message when the initialization vector is identified.

* * * * *